Figure 1:
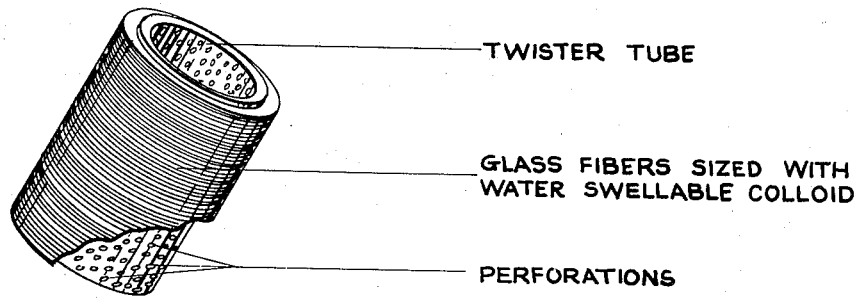

Aug. 26, 1958     R. N. KINGSBURY     2,849,333
METHOD OF DYEING TIGHTLY WOUND GLASS FIBERS
SIZED WITH A WATER SWELLABLE MATERIAL
Filed Jan. 8, 1954

INVENTOR.
RALPH N. KINGSBURY
BY
Staelin and Overman
Att'ys.

United States Patent Office

2,849,333
Patented Aug. 26, 1958

2,849,333

METHOD OF DYEING TIGHTLY WOUND GLASS FIBERS SIZED WITH A WATER SWELLABLE MATERIAL

Ralph N. Kingsbury, Pawtucket, R. I., assignor to Owens-Corning Fiberglas Corporation, a corporation of Delaware Application January 8, 1954, Serial No. 403,062

10 Claims. (Cl. 117—63)

This invention relates to the coloring of glass fibers and it relates more particularly to the dye coloring of packages of glass fibers tightly wound on a spool or twister tube and which have been sized in forming with a composition containing a gelatin or a carbohydrate such as, starch, casein, glucose, or a swellable resin, such as polyvinyl alcohol, and mixtures thereof.

The technological problem which has, to the present, confronted the industry resides in the inability to achieve uniform coloring of the glass fibers throughout the package with a dyestuff that is sufficiently resistant to light, heat, solvents and chemicals used in vulcanization and which is available in a sufficiently great range of colors to enable tinting of the glass fibers to a desired intensity or shades.

As described in the copending application Ser. No. 303,614, filed on August 9, 1952, and entitled "Dye Composition for Glass Fibers," now abandoned, glass fibers have been colored uniformly throughout the package by a system which makes use of a spirit soluble dyestuff in solution with alcohol solvents. While package dyeing can be successfully carried out with a solvent system of the type described, the spirit soluble dyestuffs tend to bleed upon contact with lacquer solvents and the like and the spirit soluble dyestuffs are not available in a sufficiently large range of colors nor do they possess the desired resistance to light, heat, solvents and the chemicals involved in the vulcanization process.

It has been found that the acid or direct dyestuffs which are water soluble are superior to the oil or spirit soluble dyestuffs with respect to resistance to deterioration by heat, light or vulcanization and they are also more resistant to bleeding or attack by ordinary solvents. Such water soluble dyestuffs are available in a much greater range of colors and can be used in accordance with the practice of this invention to introduce greater intensity of color in the processes of dyeing glass fibers. The difficulty in the use of the water soluble direct or acid dyestuffs resides in the inability to achieve uniform and complete penetration of the dyestuff into the package of glass fibers to enable package dyeing in conventional equipment in an efficient and rapid manner. When the direct or acid dyestuffs are incorporated in an aqueous system for package dyeing, penetration into the package for uniform coloring of the glass fibers is difficult to achieve. While the conditions responsible for the inability of the dye system completely to penetrate into the package are incapable of positive identification, it is believed that the substantially complete aqueous system causes swelling of the gelatin or other carbohydrates on the surfaces of the tightly wound glass fibers so as to block penetration of the dyestuff into the interior of the package.

While it might be expedient to size the glass fibers in forming with a composition that is free of such carbohydrates and water swellable resins, other resinous materials which might be used for sizing are generally incapable of providing a suitable base for dye coloring and the majority of such other materials are incapable of sufficient anchorage onto the surfaces of the glass fibers under high humidity conditions, whereas gelatin and the other carbohydrates which are preferably used in combination therewith maintain a bonding relation with the glass fiber surfaces under a wide variety of atmospheric conditions, and they provide a desirable base for dye coloring.

Thus, it is an object of this invention to provide means for package dyeing glass fibers which are sized with gelatin and other carbohydrates and water swellable resinous materials, and it is a related object to provide a method for coloring glass fibers of the type described with an acid or direct dyestuff.

Figure 2:
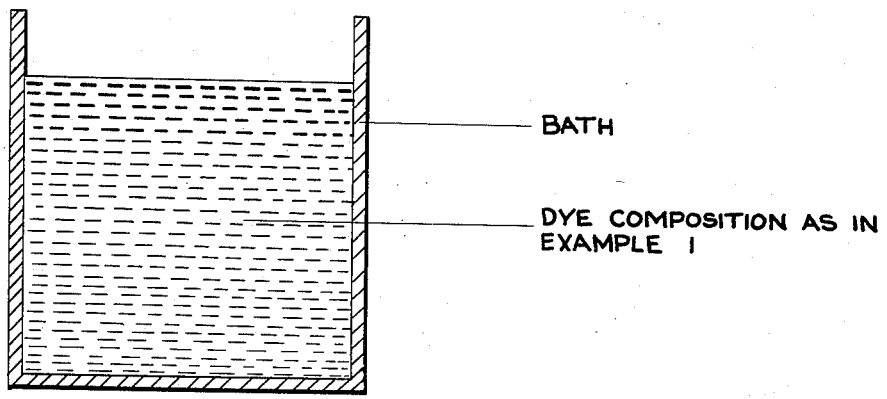

These and other objects and advantages of this invention will hereinafter appear and for purposes of illustration, but not of limitation, an embodiment of the invention is shown in the accompanying drawing in which:

Figure 1 is a schematic diagram illustrating the practice of this invention, and Figure 2 is an enlarged sectional view through a glass fiber treated in accordance with the practice of this invention.

In accordance with the practice of this invention, complete and rapid penetration, to color the glass fibers with a direct or acid dyestuff, is achieved by the treatment of the package of sized glass fibers with a composition containing the water soluble acid or direct dyestuff in a fluid composition, which is composed chiefly of alcohol in a substantially non-solvent system having a coupler to maintain the stability of the composition under the conditions of use and which may contain a small amount of water, but in amounts insufficient to interfere with the penetration of the composition into the interior of the package.

*Example 1*

Dye composition:

1 gram Pontamine Sky Blue 6BX, Color Index 518, a direct acid dyestuff
3 milliliters ethylene glycol
97 milliliters methyl alcohol The dyestuff is introduced into the ethylene glycol and the mixture is heated for solution to about 150° F. with stirring. After the mixture has cooled, the methyl alcohol is incorporated slowly and the composition filtered to remove undissolved salts or other solids.

For dyeing by conventional equipment, the packages with the glass fibers tightly wound on a twister tube having perforations through the walls thereof are mounted on spindles of a frame member which is adapted to be lowered or immersed in a bath of the dye composition of Example 1. The fluid composition is circulated through the spindles and through the bath until the composition has substantially completely impregnated the packaged fibers by penetration from the interior as well as the exterior walls. Upon completion, the frame is removed from the bath and the excess dye composition allowed to drain back and then the tubes are dried in a circulating oven or the like conventional air drying equipment.

Instead of ethylene glycol, use may be made of other couplers such as glycerine or other polyhydric alcohols of low carbon length or of glycol ethers such as methyl "cellosolve" (ethylene glycol mono methyl ether), ethyl "cellosolve" (ethylene glycol mono ethyl ether), butyl "cellosolve" (ethylene glycol mono methyl ether) and the like. The concentration of the coupler in the dye composition should be sufficient to maintain stability of the treating composition under conditions of use. Usually a concentration of 5 percent coupler will be sufficient depending upon the character of the coupler as well as the dyestuff but it will be preferred to make use of an amount within the range of 7–15 percent by weight. While more coupler can be used, it is undesirable from the standpoint of cost to make use of coupler in amounts greater than 50 percent by weight of the treating composition. In addition to its function as a coupling agent to stabilize the mixture, the coupler operates to soften the gelatin or other carbohydrate film forming material in the size on the glass fiber surfaces to enable more complete penetration of the dyestuff. Such penetration to integrate the dyestuff into the size coating the fibers further increases the resistance of the colored fibers to the bleeding of the dyestuff in use or in subsequent printing or lacquering operations.

The alcohol which forms the major constituent of the dye composition is incapable of functioning as a solvent to dissolve the dyestuff but it operates more in the manner of a diluent to form a non-solvent system which relies upon the coupler to maintain compatibility in a stable composition. Instead of methyl alcohol, use may be made of ethyl alcohol, propyl alcohol, butyl alcohol and the like, and mixtures thereof, but it is important to formulate the diluent and coupler of materials capable of rapid elimination by evaporation to set the dyestuff on the glass fibers.

The following are illustrative of other dye compositions which may be used in the practice of this invention for dye coloring glass fibers having a size containing gelatin or other carbohydrates of water swellable resinous materials.

Example 2

1 gram Artol Scarlet M
4 milliliters methyl "cellosolve" (ethylene glycol mono methyl ether)
96 milliliters methyl alcohol

Example 3

1–5 grams Nigrosine DGY crystals, Color Index 865
3–50 milliliters glycerine
96–50 milliliters methyl alcohol

Example 4

1 percent Palatine Fast Yellow GRNA–CF, Color Index 865, Prototype 316
6 percent methyl "cellosolve" (ethylene glycol mono methyl ether)
93 percent methyl alcohol The Pontamine dye of Example 1 is one of the group of direct dyestuffs which may be used in accordance with the practice of this invention, marketed by E. I. du Pont de Nemours & Company of Wilmington, Delaware. The Artol Scarlet M is a special color manufactured by Sandos Chemical Works, Incorporated. The Palatine dyestuff constitutes one of the members of suitable direct acid dyes, marketed by General Dyestuffs Corporation of New York city. The amount of dyestuff should be sufficient to impart the desired intensity of color on the glass fibers. Usually it will be sufficient to make use of from 1–10 percent by weight of the treating composition, depending upon the character of the dyestuff, but it is preferred to maintain the concentration of the dyestuff to between 1 and 5 percent by weight.

While substantial amounts of water cannot be tolerated in the dye composition for treating glass fibers of the type described, it has been found that when water is present in amounts less than about 5 percent by weight the water functions greatly to simplify the preparation of the dye composition and enable the use of direct and acid dyes of limited solubilities and therefore makes available the use of direct and acid dyestuffs of much greater color range. The small amount of water in a dye composition of the type described further stabilizes the composition to resist deterioration or break-down in response to changes in temperature or conditions of use. The amount of water in the spirit system is incapable of interfering with the ease of penetration of the dye composition into the interior of the package for uniform coloring of the glass fibers but is effective to increase the penetration of the dyestuff into the coating on the glass fibers with a corresponding deepening of the shades produced.

The following will illustrate a formulation embodying an aqueous medium in a diluent system of the type embodying features of this invention:

Example 5

1–5 parts by weight Palatine Fast Yellow GRNA–CF, Color Index 865, Prototype 316, direct acid dyestuff
5–10 parts by weight methyl "cellosolve" (ethylene glycol mono methyl ether)
1–5 parts by weight water
80–95 parts by weight methyl alcohol It will be understood that the process herein described for the coloring of glass fibers has application primarily to glass fibers which have heretofore been difficult to color with a dyestuff that is resistant to bleeding with lacquer solvents and which is highly resistant to deterioration in response to heat, light and the chemicals used in vulcanization processes.

The process described and claimed herein makes it possible for the first time to achieve rapid and complete penetration to color glass fibers tightly wound in packages with direct and acid dyestuffs that are more permanent on the glass fiber surfaces and which can be made available in a much greater range of colors than has heretofore been possible to secure with spirit soluble dyes. Because of the formulation of the acid or direct dyestuff in a non-solvent system which is substantially free of water, complete and rapid penetration is achieved with conventional equipment while reaction to assist penetration into the size on the glass fiber surfaces is available to provide for better anchorage of the dyestuff and the development of deeper shades.

It will be understood that treatment with compositions of the type described to color glass fibers with liquid compositions containing the dyestuff may be effected by conventional systems other than the dip process described and that changes may be made in the details of formulation, the method of incorporating the various materials in preparation of the dye composition, and in the use thereof without departing from the spirit of the invention, especially as defined in the following claims.

I claim:

1. The method for coloring glass fibers sized with a composition containing a water swellable adhesive and in which the sized glass fibers are tightly wound into a package, comprising impregnating the package of glass fibers with a dye composition formed of a diluent and a dyestuff in which the dyestuff constitutes a water soluble dyestuff selected from the group consisting of direct and acid dyestuffs in amounts sufficient to impart the desired intensity of color to the glass fibers and in which the diluents consist essentially of 5–50 percent by weight of a coupler selected from the group consisting of polyhydric alcohols of low carbon length and polyhydric alcohol esters of low carbon length, with the remainder being formed of an alcohol having a short carbon chain which function as a non-solvent diluent for the water soluble dyestuff but which forms a stable composition in the presence of the coupler.

2. The method for coloring glass fibers sized with a composition containing a water swellable adhesive and in which the sized glass fibers are tightly wound into a package, comprising impregnating the package of glass fibers with a dye composition in the form of a diluent containing 1–10 percent by weight of a water soluble dyestuff selected from the group consisting of direct and acid dyestuffs and in which the diluent consists essentially of from 7–15 percent by weight of a coupler selected from the group consisting of polyhydric alcohols of low carbon length and polyhydric alcohol esters of low carbon length, with the remainder being formed of an alcohol having a short carbon chain which functions as a non-solvent diluent for the water soluble dyestuff but which forms a stable composition in the presence of the coupler.

3. The method for coloring glass fibers sized with a composition containing a water swellable adhesive and in which the sized glass fibers are tightly wound into a package, comprising impregnating the package of glass fibers with a dye composition formed of a diluent containing from 1–10 percent by weight of a water soluble dyestuff selected from the group consisting of acid and direct dyestuffs and in which the diluent consists essentially of 5–50 percent by weight of a coupler selected from the group consisting of a polyhydric alcohol of low carbon length and a polyhydric alcohol ester of low carbon length, less than 5 percent by weight of water, the remainder comprising alcohol having a short carbon chain as the major diluent which is a non-solvent for the water soluble dyestuff but which forms a stable composition in the presence of the coupler and water.

4. The method for coloring glass fibers sized with a composition containing a water swellable adhesive and in which the sized glass fibers are tightly wound into a package, comprising impregnating the package of glass fibers with a dye composition formed of a diluent containing 1–10 percent by weight of a water soluble dyestuff selected from the group consisting of acid and direct dyestuffs and in which the diluents consist essentially of 7–15 percent by weight of a coupler selected from the group consisting of a polyhydric alcohol of low carbon length and a polyhydric alcohol ester of low carbon length, less than 5 percent by weight of water, the remainder comprising alcohol having a short carbon chain as the major diluent which is a non-solvent for the water soluble dyestuff but which forms a stable composition in the presence of the coupler and water.

5. The method of coloring glass fibers as claimed in claim 1 in which the coupler comprises ethylene glycol.

6. The method of coloring glass fibers as claimed in claim 1 in which the coupler comprises glycerine.

7. The method of coloring glass fibers as claimed in claim 1 in which the coupler comprises ethylene glycol mono methyl ether.

8. The method of coloring glass fibers as claimed in claim 1 in which the coupler comprises ethylene glycol mono ethyl ether.

9. The method of coloring glass fibers as claimed in claim 4 in which the coupler comprises ethylene glycol.

10. The method of coloring glass fibers as claimed in claim 4 in which the coupler comprises ethylene glycol mono methyl ether.

References Cited in the file of this patent

UNITED STATES PATENTS

| | | |
|---|---|---|
| 1,977,345 | Moore et al. | Oct. 16, 1934 |
| 1,979,188 | Bouhuys | Oct. 30, 1934 |
| 2,058,576 | Dulken | Oct. 27, 1936 |
| 2,123,152 | Rivat | July 5, 1938 |
| 2,133,238 | Slater et al. | Oct. 11, 1938 |
| 2,176,403 | Koch | Oct. 17, 1939 |
| 2,215,061 | Alt | Sept. 17, 1940 |
| 2,446,119 | White | July 27, 1948 |
| 2,691,564 | Berglund | Oct. 12, 1954 |

FOREIGN PATENTS

| | | |
|---|---|---|
| 313,980 | Great Britain | Dec. 9, 1943 |